United States Patent
Bitto et al.

(10) Patent No.: US 6,591,656 B1
(45) Date of Patent: Jul. 15, 2003

(54) PROCESS FOR BENDING MEASURING TUBES

(75) Inventors: Ennio Bitto, Aesch (CH); Ruben Kiefer, Binningen (CH)

(73) Assignee: Endress + Hauser Flowtec AG, Reinach (CH)

( * ) Notice: Subject to any disclaimer, the term of this patent is extended or adjusted under 35 U.S.C. 154(b) by 31 days.

(21) Appl. No.: 09/722,698

(22) Filed: Nov. 28, 2000

Related U.S. Application Data

(60) Provisional application No. 60/233,480, filed on Sep. 19, 2000.

(30) Foreign Application Priority Data

Sep. 14, 2000 (EP) .............................................. 00120003

(51) Int. Cl.$^7$ ................................................. B21D 9/15
(52) U.S. Cl. ........................................ 72/369; 72/466.2
(58) Field of Search ...................... 72/369, 466, 466.2

(56) References Cited

U.S. PATENT DOCUMENTS

| | | | | |
|---|---|---|---|---|
| 2,044,322 A | * | 6/1936 | Oliver et al. .................. | 72/369 |
| 2,334,661 A | * | 11/1943 | Weimer ......................... | 72/369 |
| 4,916,952 A | | 4/1990 | Thielmann et al. | |
| 5,555,762 A | * | 9/1996 | Kawamura et al. ............ | 72/369 |
| 5,907,896 A | | 6/1999 | Tseng | |
| 5,974,854 A | | 11/1999 | Tseng | |

FOREIGN PATENT DOCUMENTS

| | | |
|---|---|---|
| DE | 113084 | 8/1889 |
| DE | 3701612 A1 | 8/1988 |
| DE | 19833006 A1 | 2/2000 |
| EP | 0659500 A1 | 6/1995 |

OTHER PUBLICATIONS

R. Balbach, Niedrigschmelzende Legierungen als Abstutzwerkstoff bei der Bearbeitung . . . , Blech Rohre Profile 32, 1985, 9, S. 511.
JP 07265962A, Patent Abstracts of Japan, Oct. 17, 1995, Hirano Mitsuharu.
07148834, Patent Abstract of Japan, Jun. 13, 1995, Yamada Yonekazu.
04265730, Patent Abstracts of Japan, Sep. 21, 1992, Suzuki Manabu.

* cited by examiner

Primary Examiner—Lowell A. Larson
(74) Attorney, Agent, or Firm—Jones, Tullar & Cooper, P.C.

(57) ABSTRACT

By means of this process it is intended to achieve a high mechanical-geometric accuracy of bent tubes, and it is used for bending a measuring tube for a Coriolis mass flow rate sensor by means of a tube section of a predetermined length and by means of a two-piece press mold, which has been matched to both the measuring tube, which has an inner diameter and an outer diameter, and to the desired shape. To this end, a flexible support body is inserted into the tube section, which is fastened in a first end of the tube section in such a way, that the end is closed, and whose maximum outer diameter is less than the inner diameter of the tube section. The tube section is filled with a liquid which is subsequently permitted to solidify completely. The tube section filled with the support body and the solidified liquid is placed into the opened press mold, the latter is closed and the tube section is bent into the desired shape by this. The press mold is opened and the bent tube section is removed. The solidified liquid is permitted to melt and thereafter the support body is removed from the bent tube section, along with the melted liquid.

10 Claims, 2 Drawing Sheets

PROCESS FOR BENDING MEASURING TUBES

This application claims the benefit of provisional application No. 60/233,480, filed Sep. 19, 2000.

FIELD OF THE INVENTION

The present invention relates to a process for bending a measuring tube for a Coriolis mass flow rate sensor into a desired shape by means of a tube section of a predetermined length and by means of a two-piece press mold, which is matched to both the measuring tube, to the desired shape, and which has an inner diameter and an outer diameter.

BACKGROUND OF THE INVENTION

Such mass flow rate sensors can be divided into two classes, based on the shape of the measuring tube(s), namely mass flow rate sensors with at least one straight measuring tube, and those with at least one bent measuring tube. In connection with mass flow rate sensors with bent measuring tubes, those are of interest for the present invention, whose measuring tubes are bent in one plane, i.e. wherein the respective axis of the measuring tubes lie in this plane.

Such measuring tubes are bent, for example, into a U-shape (see U.S. Pat. No. 5,394,758), or are only bent very flat (see U.S. Pat. No. 5,796,011), or are bent into a V-shape in accordance with provisional application No. 60/205 983, filed May 19, 2000.

Such measuring tubes, which are bent in one plane and which have an inner and an outer diameter, can be bent into the desired shape by means of a two-piece press mold, which has been matched to the desired shape.

Tubes to be bent, which in most cases must be heated for this purpose, customarily must be filled with a filler material, which is as incompressible as possible and which assures, that the shape of the cross section, in most cases a circular cross section, has remained as unchanged as possible after the bending process.

It has been shown that, when bending measuring tubes for Coriolis mass flow rate sensors, this customary method using only a single incompressible filler material is not sufficient for achieving the high mechanical-geometric accuracy of the bend and of the bent measuring tubes.

Moreover, for reasons of efficiency of production it is absolutely required that the curved measuring tubes no longer need to be worked with respect to their length, in particular to be shortened. For a production batch it should therefore be possible to firmly preset the length of the straight, not yet bent tube, so that the bent measuring tubes all have a uniform, appropriately shortened final length.

OBJECT AND SUNMARY OF THE INVENTION

To solve this problem, the object of the present invention therefore lies in providing a process for bending a measuring tube for a Coriolis mass flow rate sensor into a desired shape from a tube section of a preset length and by means of a two-piece press mold, which is matched to both the measuring tube having an inner diameter and an outer diameter, and to the desired shape.

This object is attained by means of the following steps:
  inserting a flexible support body into the tube section such that one end of the tube section is closed, the maximum outer diameter of the flexible support body being less than the inner diameter of the tube section;
  filling the tube section with the support body therein with a liquid;
  permitting the liquid to solidify completely;
  providing a two-piece press mold, which is matched to the outer diameter of the tube section and to the desired shape of tube section;
  placing the tube section filled with the support body and the solidified liquid into the opened press mold;
  closing the press mold thereby bending the tube section into the desired shape;
  opening the press mold and removing the bent tube section; and
  permitting the solidified liquid to melt and thereafter removing the support body from the bent tube section along with the melted liquid.

In accordance with a first preferred embodiment of the present invention, a liquid is used which solidifies at a temperature of less than 280° C.

In accordance with a first preferred further embodiment thereof, molten bismuth is used, in a second further preferred embodiment the liquid solidifies at a temperature of less than 50° C.

In further preferred embodiments thereof, Wood's alloy, or an aqueous solution, in particular water itself, or waxes or oils are used.

In accordance with a second preferred embodiment of the present invention, a helical spring is used as the support body, which is preferably centered in the tube section by means of spacer rings. In both cases a helical spring with windings which rest against each other is preferably used.

It has been shown in a surprising manner that the combined use of a liquid together with the support body makes possible a highly accurate bending of measuring tubes of Coriolis mass flow rate sensors.

Since the support body in accordance with a characteristic of the present invention has a maximum diameter which is less than the inner diameter of the measuring tube, the support body can be easily pulled out of the measuring tube again after the bending operation and after the solidified liquid has again become liquid.

It is believed that the reason for the great accuracy during bending, i.e. the completely unaffected cross section of the measuring tube in the bent area, is that, although the solidified liquid as the filler material contributes the greater part to this high accuracy, the support body has a thin layer of the solidified liquid, which is located between the inner wall of the measuring tube and the support body and contributes the remaining portion to the high accuracy.

The present invention will now be explained in greater detail by means of the drawing figures, in which successive steps of a process in accordance with the present invention are represented- Parts with the same functions in the different figures have been provided with the same reference numerals, but are only repeated in subsequent figures if this appears to be useful.

DETAILED DESCRIPTION OF THE PREFERRED EMBODIMENT

Figure 1:
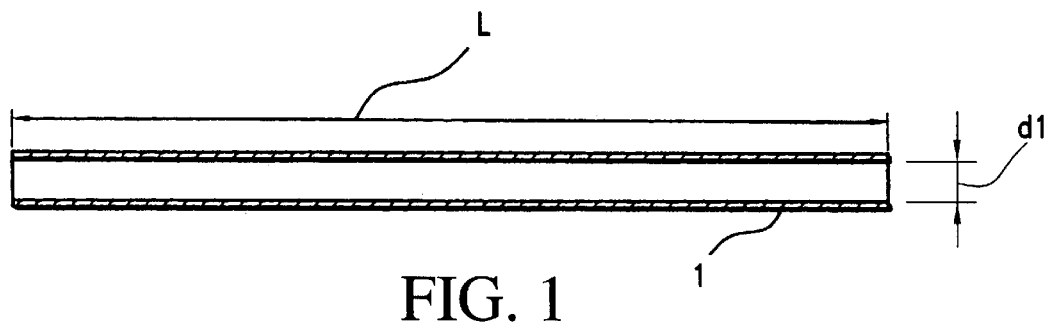
FIG. 1 is a top plan view of a tube section which is to be bent.

A tube section 1 is schematically represented in a top plan view in FIG. 1, which has been cut to a desired length L from a straight piece of tubing, not represented. The length L results in a simple manner from the desired length of the bent tube section to be used as a measuring tube after bending. The tube section 1 has an inner diameter d1 and is customarily made from special or stainless steel.

Figure 2:
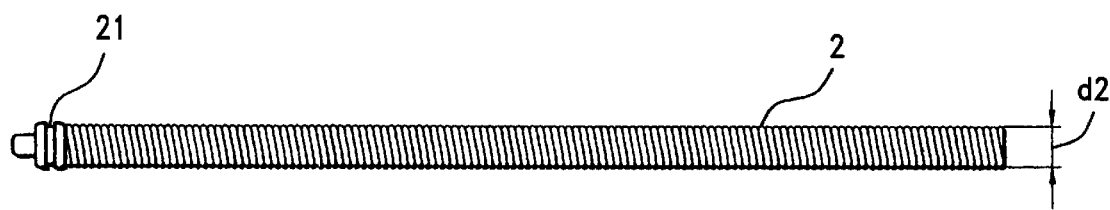
FIG. 2 is a top plan view of a support body.

A flexible support body 2, which is longer than the length L of the tube section in FIG. 1, is represented in a top plan view in FIG. 2. The support body has a maximum outer diameter d2, which is less than the inner diameter d1 of the tube section 1. A seal 21, which is suitable for closing off the tube section 1, has been screwed onto one end of the support body 2.

However, other forms of support bodies are also possible. They merely need to be capable of following the bend of the tube section and in the process to maintain their cross-sectional shape, as well as the distance between the inner wall of the tube section and the support body which exists in the not yet bent state.

Figure 3:
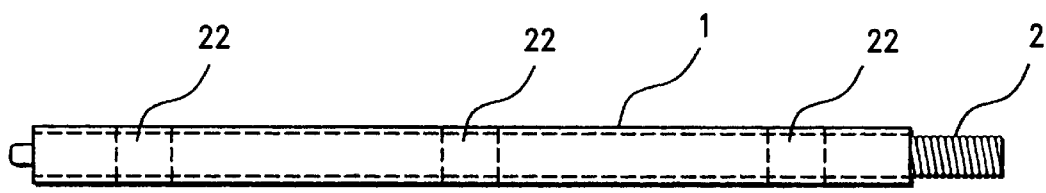
FIG. 3 is a top plan view of the tube section in FIG. 1 with the support body of FIG. 2 inserted therein.

The tube section 1 after the support body 2 has been inserted is represented in a top plan view in FIG. 3. The seal 21 is now at one end of the tube section 1, and an end of the support body 2 located opposite the seal 21 now projects from the other end because of its length, which is greater than the length L of the tube section 2. In this way the tube section 1 has been sealed against liquid on the mentioned end.

Figure 4:
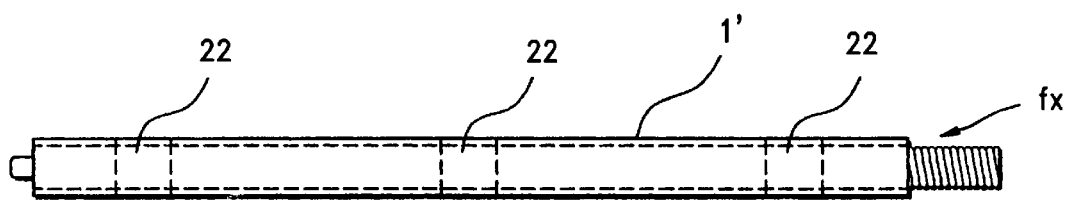
FIG. 4 is a top plan view of the tube section in FIG. 3 into which a liquid has been poured.

The tube section is again represented with the inserted support body 2 in a top plan view in FIG. 4, but now it is indicated by the arrow that the space between the tube section and the support body, as well as the latter itself if it is hollow, have been filled with a liquid fx. Thereafter, the liquid fx is permitted to solidify completely. In this state the tube section is identified by 1'.

It has furthermore been indicated by dashed lines in FIGS. 3 and 4, that in accordance with a preferred embodiment the support body 2 can be centered in the tube section 2 by means of spacer rings 22.

A helical spring is represented in each of FIGS. 2 to 4 as the preferred support body, and its windings preferably rest against each other.

Any liquid, whose solidification temperature is some hundreds of degrees Celsius lower than the melting temperature of the tube section 1 and support body 2, is suitable as the liquid fx. It is possible to use metals with in this sense lower melting points, for example the already mentioned bismuth or Wood's alloy, but also aqueous solutions, in particular water itself, or organic compounds, such as waxes or oils.

Figure 5:
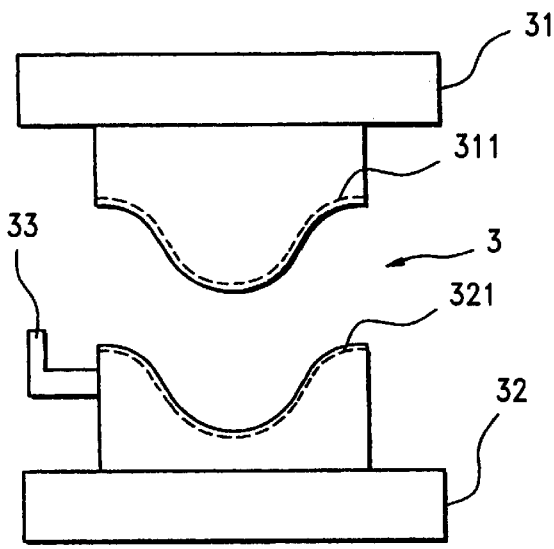
FIG. 5 is a schematic top plan view of an open press mold.

An opened press mold 3, which comprises an upper part 31 and a lower part 32, is schematically represented in a top plan view in FIG. 5. The press mold 3 has been matched to the outer diameter and the desired shape of the bent tube section 1.

For this purpose, a first groove 311 is located in the upper part 31, and a second groove 321 in the lower part 32. Both grooves have a cross section in the shape of a semicircular area, whose diameter is equal to the outer diameter of the tube section 1. When the press mold is closed the upper part 31 complements the cross section of the lower part 32 to form a full circle area. A stop 33 for the tube section 1' to be bent is attached to the lower part 32.

The two grooves 311, 321 of the press mold 3, and therefore the desired shape of the bent tube section, include a plane in which an axis of the bent tube section is located and are designed to be V-like in this plane.

Figure 6:
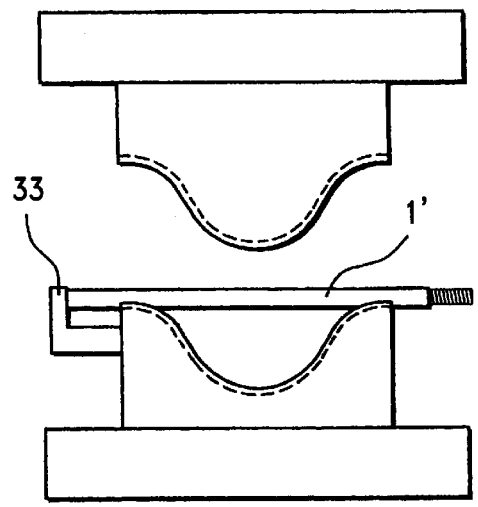
FIG. 6 is a schematic top plan view of the open press mold in FIG. 5 with the inserted tube section containing the solidified liquid and the support body.

The opened press mold of FIG. 5 is shown in a schematic top plan view in FIG. 6, into whose lower part the tube section 1' of FIG. 4, which contains the support body 2 and the solidified liquid fx, has been inserted against the stop 33.

Figure 7:
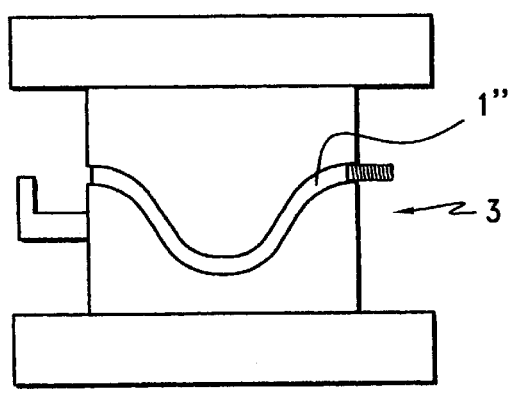
FIG. 7 is a schematic top plan view of the closed press mold of FIG. 6 and the tube section bent by means of the closing.

The closed press mold 3 in FIG. 6 with the tube section, which has been bent by the closing and is now identified by 1", is schematically represented in FIG. 7 in a top plan view. It can now be seen that, as already mentioned above in connection with the explanation of the problems on which the present invention is based, the bent tube section 1" has become shorter than the length L of the straight tube section.

Figure 8:
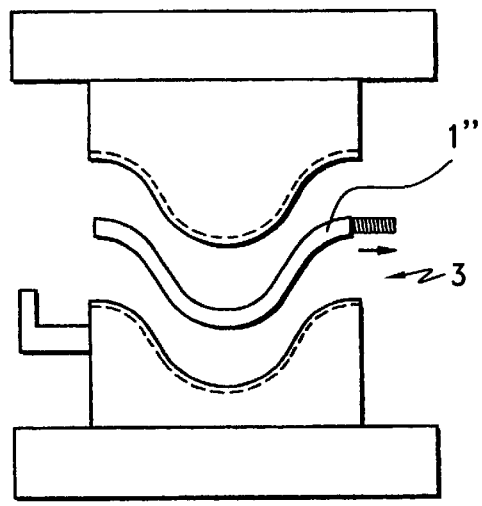
FIG. 8 is a schematic top plan view of the press mold, which has been opened again for removing the bent tube section.

Finally, the again opened press mold 3, from which the bent tube section 1" is about to be taken, is schematically represented in a top plan view in FIG. 8. The solidified liquid is permitted to melt, and thereafter the support body 2, as well as the liquid fx, are removed, which is indicated by the drawn-in arrow. The bent tube section 1" can now be further used as a measuring tube without any additional processing.

What is claimed is:

1. A process for bending a measuring tube for a Coriolis mass flow rate sensor into a desired shape from a tube section of a predetermined length, the tube having an inner diameter and an outer diameter, comprising the steps of:

inserting a flexible support body into the tube section such that one end of the tube section is closed, the maximum outer diameter of the flexible support body being less than the inner diameter of the tube section;

filling the tube section with the support body therein with a liquid;

permitting the liquid to solidify completely;

providing a two-piece press mold, which is matched to the outer diameter of the tube section and to the desired shape of the tube section;

placing the tube section filled with the support body and the solidified liquid into the opened press mold;

closing the press mold thereby bending the tube section into the desired shape;

opening the press mold and removing the bent tube section; and permitting the solidified liquid to melt and thereafter removing the support body from the bent tube section along with the melted liquid.

2. The process as claimed in claim 1, wherein a liquid is used which solidifies at a temperature of less than 280° C.

3. The process as claimed in claim 2, wherein molten bismuth is used as molten liquid.

4. The process as claimed in claim 2 wherein, a liquid is used which solidifies at a temperature of less than 50° C.

5. The process as claimed in claim 4, wherein Wood's alloy is used as molten liquid.

6. The process as claimed in claim 4, wherein an aqueous solution, in particular water, is used as molten liquid.

7. The process as claimed in claim 4, wherein waxes or oils are used as molten liquid.

8. A process for bending a measuring tube for a Coriolis mass flow rate sensor into a desired shape from a tube section of a predetermined length, the tube having an inner diameter and an outer diameter, comprising the steps of:

inserting a flexible helical spring support body into the tube section such that one end of the tube section is closed, the maximum outer diameter of the flexible helical spring support body being less than the inner diameter of the tube section;

filling the tube section with the helical spring support body therein with a liquid;

permitting the liquid to solidify completely;

providing a two-piece press mold, which is matched to the outer diameter of the tube section and to the desired shape of the tube section;

placing the tube section filled with the helical spring support body and the solidified liquid into the opened press mold;

closing the press mold thereby bending the tube section into the desired shape;

opening the press mold and removing the bent tube section; and permitting the solidified liquid to melt and thereafter removing the helical spring support body from the bent tube section along with the melted liquid.

9. The process as claimed in claim 8, wherein the helical spring support body is centered in the tube section by means of spacer rings.

10. The process as claimed in claim 8, wherein the helical spring support body has windings which rest against each other.

* * * * *